UNITED STATES PATENT OFFICE.

ALPHONSO M. CLOVER, OF DETROIT, MICHIGAN, ASSIGNOR TO PARKE, DAVIS & COMPANY, OF DETROIT, MICHIGAN, A CORPORATION OF MICHIGAN.

TRIMETHYLENE GLYCOL DISALICYLATE AND METHOD OF PREPARING THE SAME.

1,286,944.　　Specification of Letters Patent.　　Patented Dec. 10, 1918.

No Drawing.　　Application filed May 4, 1918.　Serial No. 232,488.

*To all whom it may concern:*

Be it known that I, ALPHONSO M. CLOVER, a citizen of the United States of America, residing at Detroit, in the county of Wayne and State of Michigan, have invented certain new and useful Improvements in Trimethylene Glycol Disalicylate and Methods of Preparing the Same, of which the following is a specification.

The invention consists in a new specific body, trimethylene glycol disalicylate, and the method of preparing the same as hereinafter set forth.

The new body may be obtained as follows:

Trimethylene glycol is first treated with sulfuric acid, preferably in the proportion of 100 grams of the trimethylene glycol to 50 grams of concentrated sulfuric acid, the latter being slowly added to the former and the temperature of the mixture being prevented from exceeding 100° C. by surrounding the vessel with water and stirring the mixture as the sulfuric acid is added.

Salicylic acid is then added, preferably 200 grams, and the resulting mixture heated to 100° C. in a water-bath, care being taken to prevent access of water-vapor to the mixture by providing a substantially air-tight closure for the vessel.

The reaction product is then poured into water which is limited in quantity, preferably to a liter, to facilitate the recovery of the unchanged salicylic acid. The temperature is brought to about 50° C. at which temperature the portion which is insoluble in water is liquefied. The solution is then neutralized, preferably by sodium carbonate, and is stirred to extract from the insoluble oily product the unchanged salicylic acid. On cooling, the oily product becomes semisolid and may then be removed by filtration and washed with water. The product is then dissolved in hot alcohol and the trimethylene glycol disalicylate crystallizes out on cooling. The product may be further purified by recrystallizing from alcohol.

Trimethylene glycol disalicylate has a melting-point of about 77° C. but begins to soften 2 or 3 degrees below this temperature. The pure substance is colorless, odorless and practically tasteless and insoluble in water. It dissolves readily in benzol, chloroform, acetone and ether and sparingly in alcohol and petroleum ether. It has valuable medicinal properties, especially in the treatment of rheumatism. It has the empirical formula $C_{17}H_{16}O_6$, and its constitution is expressed graphically as follows:—

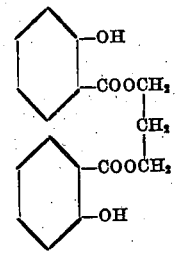

What I claim as my invention is:

1. The new body, trimethylene glycol disalicylate, having a melting-point of about 77° C., softening 2 or 3 degrees below this temperature, which is colorless, odorless, practically tasteless, insoluble in water, dissolves readily in benzol, chloroform, acetone and ether and sparingly in alcohol and petroleum ether, has the empirical formula $C_{17}H_{16}O_6$ and may be expressed graphically as follows:

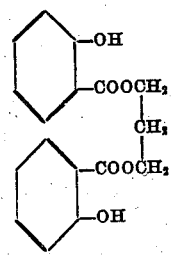

2. The method of producing trimethylene glycol disalicylate, consisting in treating trimethylene glycol with sulfuric acid, adding salicylic acid to the mixture and heating to about 100° C., and cooling and separating the insoluble product by filtration.

3. The method of producing trimethylene glycol disalicylate, consisting in treating trimethylene glycol with sulfuric acid at a temperature not exceeding 100° C., adding salicylic acid and heating to 100° C., pouring the reaction product into water and bringing to about 50° C., the temperature being sufficiently high so that the portion insoluble in water is liquefied, neutralizing, cooling to solidify the oily product, separating the latter by filtration, and purifying by recrystallization.

In testimony whereof I affix my signature in presence of two witnesses.

ALPHONSO M. CLOVER.

Witnesses:
CHARLES M. WINBRUFF,
GEORGE J. HAINES.